US010369956B2

(12) United States Patent
Deng et al.

(10) Patent No.: US 10,369,956 B2
(45) Date of Patent: Aug. 6, 2019

(54) SIDE AIRBAG WITH NECKING CHAMBER

(71) Applicant: Ford Global Technologies, LLC, Dearborn, MI (US)

(72) Inventors: Zhibing Deng, Northville, MI (US); Deepak Patel, Canton, MI (US); Krishnakanth E. Aekbote, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/463,150

(22) Filed: Mar. 20, 2017

(65) Prior Publication Data

US 2018/0265031 A1    Sep. 20, 2018

(51) Int. Cl.
| | |
|---|---|
| *B60R 21/207* | (2006.01) |
| *B60R 21/231* | (2011.01) |
| *B60R 21/233* | (2006.01) |
| *B60R 21/239* | (2006.01) |
| *B60R 21/2338* | (2011.01) |
| *B60R 21/235* | (2006.01) |
| *B60R 21/00* | (2006.01) |

(52) U.S. Cl.
CPC ...... *B60R 21/23138* (2013.01); *B60R 21/207* (2013.01); *B60R 21/233* (2013.01); *B60R 21/235* (2013.01); *B60R 21/239* (2013.01); *B60R 21/2338* (2013.01); *B60R 2021/0009* (2013.01); *B60R 2021/0055* (2013.01); *B60R 2021/0058* (2013.01); *B60R 2021/23146* (2013.01); *B60R 2021/23308* (2013.01); *B60R 2021/23324* (2013.01); *B60R 2021/23523* (2013.01); *B60R 2021/23542* (2013.01)

(58) Field of Classification Search
CPC ............ B60R 21/23138; B60R 21/233; B60R 21/207
USPC ............................................... 280/729, 730.2
See application file for complete search history.

(56) References Cited

U.S. PATENT DOCUMENTS

| | | | |
|---|---|---|---|
| 6,530,595 B2 * | 3/2003 | Masuda ................ | B60R 21/232 280/729 |
| 6,561,539 B1 * | 5/2003 | Sunabashiri ...... | B60R 21/23138 280/729 |

(Continued)

FOREIGN PATENT DOCUMENTS

| | | |
|---|---|---|
| JP | H10273010 A | 10/1998 |
| JP | H1148906 A | 2/1999 |

(Continued)

OTHER PUBLICATIONS

Search Report from the United Kingdom Intellectual Property Office dated Aug. 31, 2018 regarding Application No. GB1804061.8 (4 pages).

*Primary Examiner* — Faye M Fleming
(74) *Attorney, Agent, or Firm* — Frank A. MacKenzie; Bejin Bieneman PLC

(57) ABSTRACT

A side airbag for a vehicle includes a main chamber and a necking chamber. The main chamber has an opening for connecting to an inflator and a first thickness in an inflated condition. The necking chamber is peripherally surrounded by the main chamber and is connected to the main chamber by a restrictive vent. The necking chamber has a second thickness in the inflated condition less than the first thickness and is aligned with a targeted body area.

11 Claims, 7 Drawing Sheets

(56) References Cited

U.S. PATENT DOCUMENTS

| | | | |
|---|---|---|---|
| 6,802,529 B2* | 10/2004 | Takedomi | B60R 21/217 |
| | | | 280/729 |
| 7,448,645 B2 | 11/2008 | Bederka et al. | |
| 7,559,573 B2* | 7/2009 | Fukawatase | B60R 21/23138 |
| | | | 280/730.2 |
| 7,793,973 B2* | 9/2010 | Sato | B60R 21/235 |
| | | | 280/729 |
| 7,871,104 B2* | 1/2011 | Hayashi | B60R 21/23138 |
| | | | 280/729 |
| 7,954,844 B2* | 6/2011 | Kamiyama | B60R 21/232 |
| | | | 280/729 |
| 8,246,076 B2 | 8/2012 | Schmidt et al. | |
| 8,322,747 B2 | 12/2012 | Shankar | |
| 8,596,674 B2 | 12/2013 | Fukawatase et al. | |
| 9,399,440 B2* | 7/2016 | Fujiwara | B60R 21/2346 |
| 2006/0022441 A1 | 2/2006 | Hayashi et al. | |
| 2007/0170707 A1 | 7/2007 | Sato et al. | |
| 2011/0012327 A1 | 1/2011 | Enders | |
| 2014/0138938 A1 | 5/2014 | Kobayashi | |
| 2014/0375032 A1* | 12/2014 | Fukawatase | B60R 21/239 |
| | | | 280/729 |
| 2016/0221528 A1* | 8/2016 | Sugimura | B60R 21/23138 |

FOREIGN PATENT DOCUMENTS

| | | | | |
|---|---|---|---|---|
| JP | H11180244 A | | 7/1999 | |
| JP | 4720714 B2 | | 4/2011 | |
| JP | 2014133462 A | * | 7/2014 | B60R 21/207 |
| JP | 2014189074 A | | 10/2014 | |
| KR | 1020070066282 A | | 6/2007 | |

\* cited by examiner

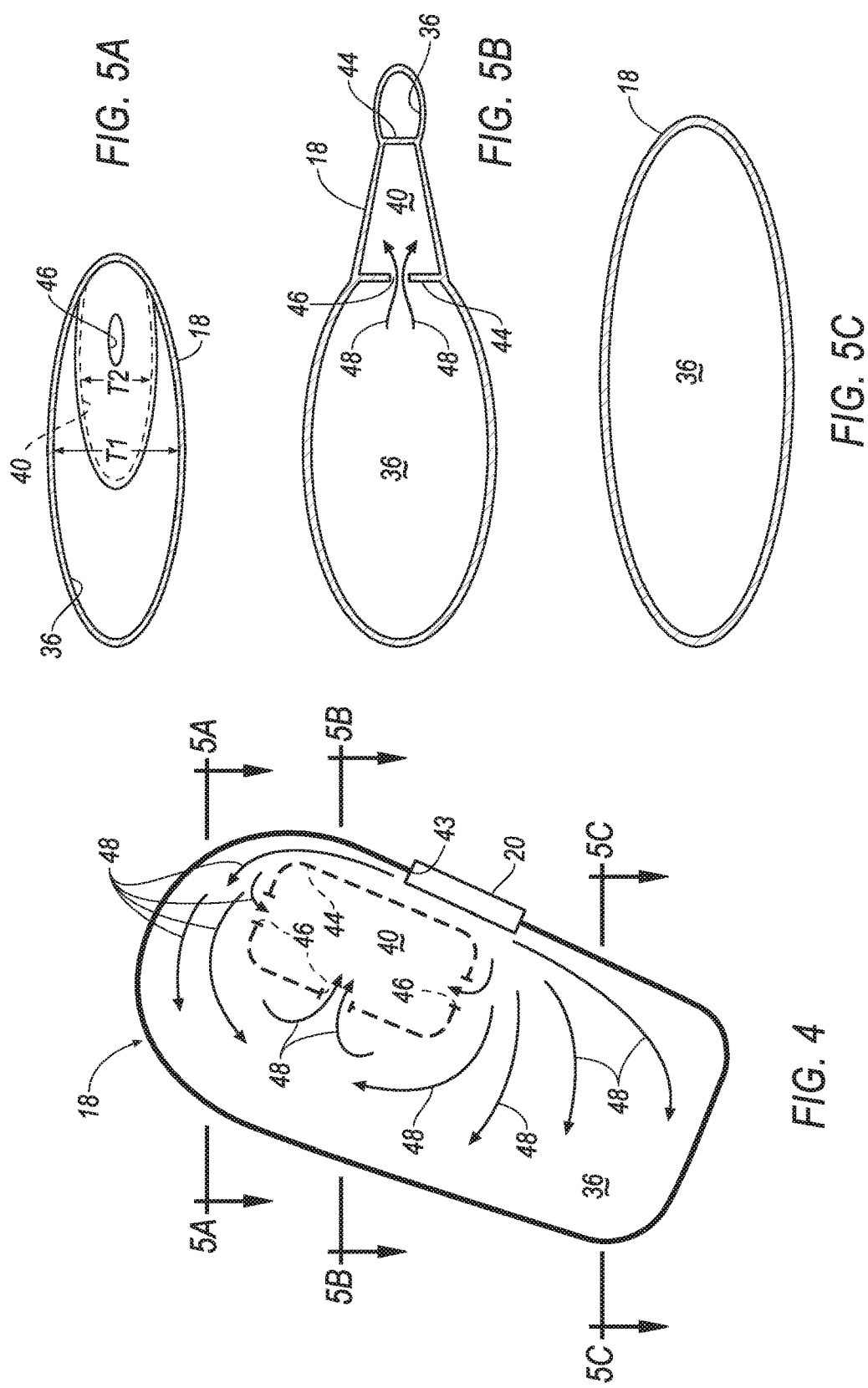

SIDE AIRBAG WITH NECKING CHAMBER

BACKGROUND

A side airbag may be used to help protect a vehicle occupant during an oblique impact of a vehicle. However, the side airbag may exert a significant force against the occupant during an impact. There is a need to provide an airbag that provides area-specific impact stiffnesses with greater stiffness in an area of the airbag aligned with a more impact resistant area of the human body and less stiffness in an area of the airbag aligned with a less impact resistant area of the human body, and reducing a reactive force in that area.

BRIEF DESCRIPTION OF THE DRAWINGS

FIG. 4 is a side view of the airbag of FIG. 3 with arrows indicating a gas flow path in the airbag.

FIGS. 5A-5C are sectional views of the airbag of FIG. 4 taken in the direction of arrows 5A-5C.

DETAILED DESCRIPTION

Figure 1:
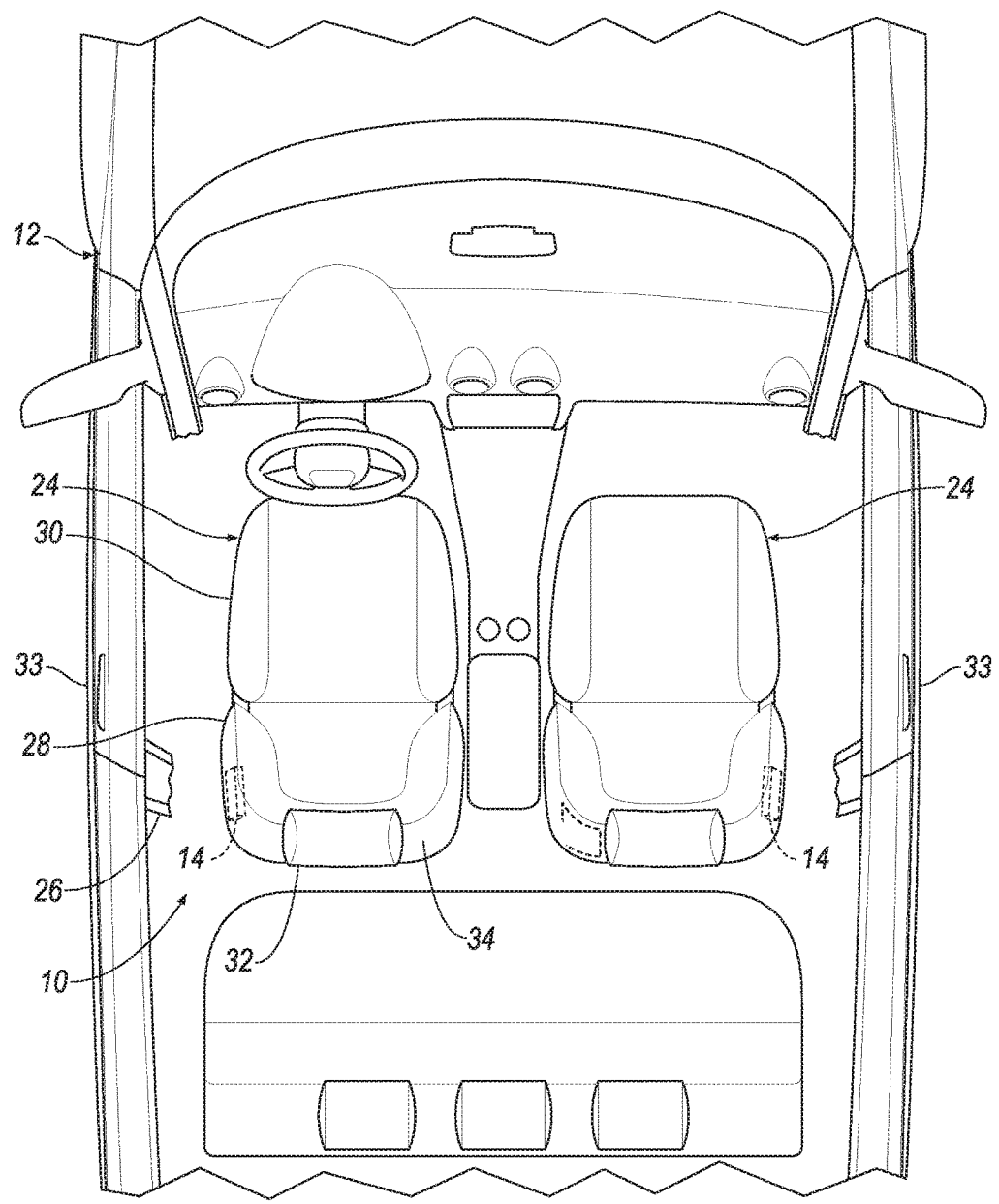
FIG. 1 is a plan view of an example view illustrating example locations of side airbag modules in an example vehicle.
Figure 2:
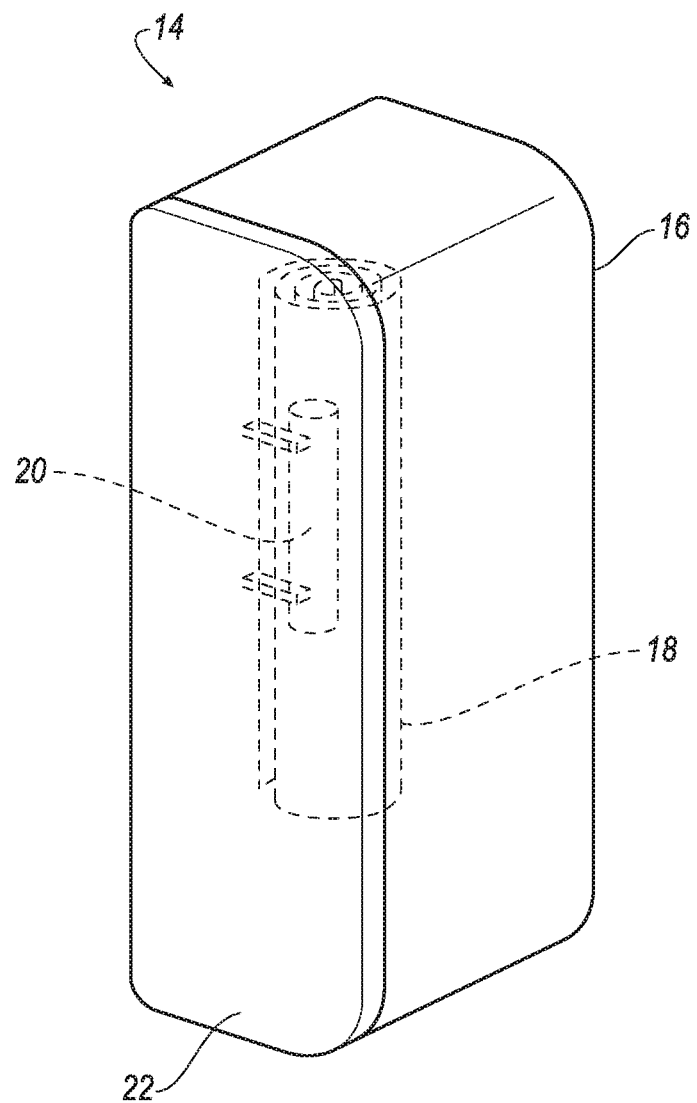
FIG. 2 is a plan view of an example side airbag module.
Figure 3:
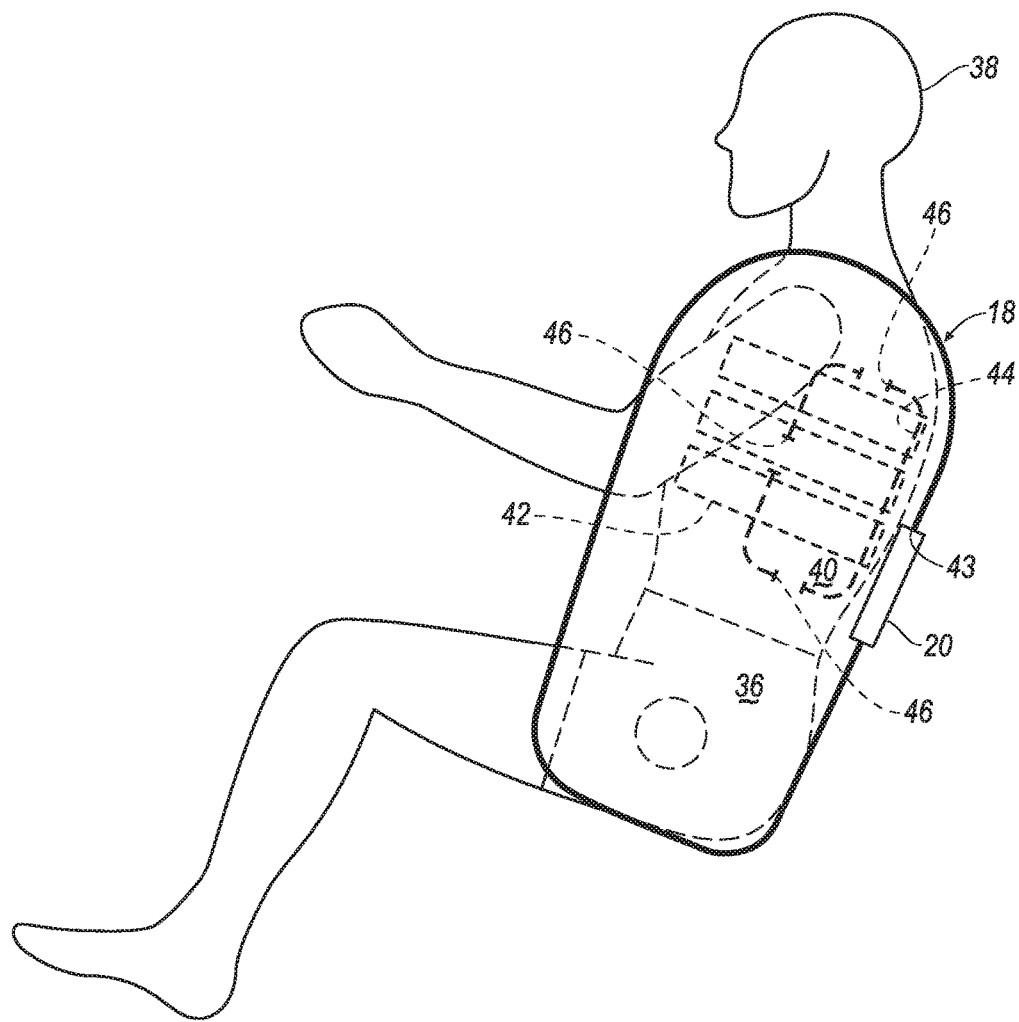
FIG. 3 is a side view of an example side airbag disposed in a deployed position relative to an example impact dummy in a seated position.

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a seat, facing a dashboard. In the Figures, like numerals indicate like parts throughout the several views.

A side airbag for a vehicle includes a main chamber and a necking chamber. The main chamber has an opening for connecting to an inflator and a first thickness in an inflated condition. The necking chamber is peripherally surrounded by the main chamber and is connected to the main chamber by a restrictive vent. The necking chamber has a second thickness in the inflated condition less than the first thickness and is aligned with a targeted body area.

The side airbag may further include a wall separating the main chamber from the necking chamber and in part defining the second thickness.

The side airbag, when it includes a wall, has the restrictive vent disposed in the wall.

The side airbag, when it includes a wall, may further include a plurality of restrictive vents disposed in the wall.

The side airbag may include the opening for connecting to the inflator at a rear of the airbag in the inflated condition, and no restrictive vent on a rear side of the necking chamber.

The side airbag, in the inflated condition, may be sized to extend substantially from a seat bottom to a top of a seat back.

The side airbag has as the targeted body area one of a rear rib-cage area and a pelvic area.

A side airbag module for a passenger vehicle includes a housing, an inflator and an airbag. The housing is shaped for mounting in a seat back. The inflator is connected to the housing. The airbag is disposed in the housing in a deflated condition. The airbag includes a main chamber and a necking chamber. The main chamber has an opening for receiving an inflator. The main chamber, in an inflated condition, has a first thickness. The necking chamber is peripherally surrounded by the main chamber. The necking chamber is connected to the main chamber by a restrictive vent. The necking chamber has a second thickness in the inflated condition less than the first thickness and is aligned with a targeted body area.

The module may further include a wall separating the main chamber from the necking chamber and in part defining the second thickness.

The module, when it includes a wall, has the restrictive vent disposed in the wall.

The module, when it includes a wall, may further include a plurality of restrictive vents disposed in the wall.

The module's opening for connecting to the inflator is at a rear of the airbag in the inflated condition and none of the restrictive vent is not on a rear side of the necking chamber.

The module's airbag, in the inflated condition, may be sized to extend substantially from a seat bottom to a top of a seat back.

The module has as the targeted body area one of a rear rib-cage area and a pelvic area.

A side airbag system for use in a passenger vehicle includes a seat back, and a side airbag module. The seat back has a cover. The side airbag module is shaped for mounting in a seat back and is fixed to the seat back beneath the cover. The side airbag module includes a housing, an inflator, and an airbag. The housing is shaped for mounting in a seat back. The inflator is connected to the housing. The airbag includes a main chamber and a necking chamber. The airbag is disposed in the housing in a deflated condition. The main chamber has a part of the inflator disposed therein and has a first thickness in an inflated condition. The necking chamber is peripherally surrounded by the main chamber and is connected to the main chamber by a restrictive vent. The necking chamber has a second thickness in the inflated condition less than a thickness of the first thickness and is aligned with a targeted body area.

The side airbag system may include a wall separating the main chamber from the necking chamber and in part defining the second thickness.

The side airbag system, when it includes a wall, has the restrictive vent disposed in the wall.

The side airbag system, when it includes a wall, may include a plurality of restrictive vents disposed in the wall, with none of the vents being in a rear portion of the wall.

The side airbag system's airbag, in the inflated condition, may be sized to extend substantially from a seat bottom to a top of a seat back.

The side airbag system has as the targeted body area one of a rear rib-cage area and a pelvic area.

An airbag system 10, as illustrated in FIGS. 1-8, is part of a restraint system for a vehicle 12. The airbag system 10 includes a side airbag module 14. The airbag system 10 may be part of a restraint system that also includes seatbelts (not shown).

The construction of airbag modules 14 is known in the art of airbag systems. An example housing 16, receives an airbag 18 in a deflated and folded condition. Airbag 18 may be inflated by a single source of pressurized gas such as an inflator 20. An example hinged or tearable cover 22 may be included to prevent airbag 18 from unfolding before deployment.

The example inflator 20 may be disposed against the housing 16 on a side opposite the airbag 18. Although such a connection is not shown in the figures, inflator 20 is connected to airbag 18 to enable inflation of airbag 18 during deployment. The inflator 20 may be, for example, a pyrotechnic inflator that uses a chemical reaction to drive an inflation medium to the airbag. The inflator 20 may alternatively be of any other suitable type, e.g., a cold-gas inflator. The inflator 20 may also include a connector, e.g., a tube (not shown) disposed between a gas generating portion of the inflator 20 and the airbag 18. Alternatively, the inflator 20 may be disposed partially or completely within the airbag 18.

The housing 16 provides a reaction surface for the airbag 18 in the inflated condition. The housing 16 may be formed of any rigid material, e.g., a rigid polymer, a metal, a composite, etc.

The side airbag module 14 may be fixed to and supported by either of a seat 24 or a structural body member, e.g., a B-pillar 26. The seat 24 shown in FIG. 1 is a bucket seat, but alternatively the seat 24 may be a bench seat or another type of seat. The seat 24 may include a seat back 28, a seat bottom 30, and a headrest 32. The seat 24 may be adjacent to a vehicle closure, e.g., a vehicle door 33, on an outboard side.

The seat back 28 may be supported by the seat bottom 30 and may be stationary or movable relative to the seat bottom 30. The seat back 28 may include a frame (not shown) and a seat covering 34 supported on the frame. The airbag module 14, when mounted to the seat 24, may be fixed to a frame of the seat back 28, underneath the seat covering 34. The housing 16 may be shaped to accommodate mounting in the seat back 28. The frame may include tubes, beams, etc. and formed of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc.

The covering 34 may include upholstery and padding. The upholstery may be formed of cloth, leather, faux leather, or any other suitable material. The upholstery may be stitched in panels around the frame. The padding may be between the covering 34 and the frame, and may be foam or any other suitable material.

The airbag 18 may be formed of a woven polymer or any other material. As one example, the airbag 18 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The airbag 18 of FIGS. 3-5C includes an example main chamber 36 that, in the inflated condition, extends from a lower point proximate to the seat bottom 30 upward to an upper point proximate to a top of the seat back 28, or alternatively, proximate to a top of a shoulder of a selected test dummy 38, e.g., a $50^{th}$ percentile male EuroSID2 (second generation European side impact dummy). The main chamber 36 has a first thickness in an inflated condition of T1. Airbag 18 also includes a necking chamber 40. The necking chamber 40 is peripherally surrounded, i.e., surrounded about its entire outer periphery, by main chamber 36. The necking chamber has a second thickness in an inflated condition of T2, less than thickness T1 of the main chamber 36. In the embodiment illustrated in FIGS. 3-5C, the necking chamber 40 of the airbag 18 in the inflated condition is substantially aligned with a rear area of a rib cage 42 of the EuroSID2 dummy 38 with the dummy 38 in an upright position. An example area of a necking chamber 40 protecting a rear area of a rib cage may be an area from 10 centimeters to 30 centimeters below a top of airbag 18 and from 5 centimeters to 15 centimeters forward of a rear of the airbag 18 in the inflated condition.

The main chamber 36 is connected to the inflator 20 and may include an opening 43 for receiving the inflator 20. The main chamber 36 receives gas from the inflator 20 when the inflator is actuated.

The main chamber 36 is separated from the necking chamber 40 by a wall 44. A restrictive vent 46 connecting the main chamber 36 with the necking chamber 40 may be disposed in the wall 44. Alternatively, a plurality of restrictive vents 46 may be disposed in wall 44 around its perimeter. The necking chamber 40 receives inflator gas from the main chamber 36 through the vent 46 or vents 46. A height of wall 44 may restrict the thickness T1 of the necking chamber 40 when fully inflated.

The disclosed airbag operates in the following manner. As is known, in the event of an impact, an impact sensor (not shown) may detect the impact and transmit a signal through a communications network (not shown) to a vehicle controller (not shown). The vehicle controller may transmit a signal through the communications network to the inflator 20. The inflator 20 may discharge and inflate the airbag 18 of FIGS. 3-5C to an inflated condition. Upon receiving a signal from, e.g., the vehicle controller, the inflator 20 may inflate the airbag 18 with an inflatable medium, such as a gas.

The inflatable medium, as illustrated by example arrows 48 showing gas flow paths, enters the main chamber 36 from the inflator 20. Air bag 18 expands, tearing cover 22 and also tearing the seat covering 34 in a known manner. The air bag 18 expand in forward and vertical directions, disposing itself between an occupant, as represented by dummy 38, and the vehicle door 33. As the air bag 18 expands, the inflatable medium begins to enter the necking chamber 40 through the restrictive vents 46 in the wall 44. The restrictive vents 46 yield a lower pressure in the necking chamber 40 than in the main chamber 36 during inflation.

With an oblique impact, the occupant is accelerated laterally within the vehicle, tending to resist the impact force against the vehicle. When the impact force is against a side of the vehicle 12 adjacent the occupant, the occupant moves toward the adjacent door 33. The side air bag 18, intervening between the door 33 and the occupant, provides an energy absorbing cushion therebetween. The occupant is further benefited by the inclusion of the necking chamber, as resultant air bag is more complementary to the various abilities of the various areas of the human body to absorb energy. The example airbag is more pressurized in the main chamber engaging the front portion of the rib cage while the necking chamber engages the more vulnerable rear portion of the rib cage. The necking chamber offers a softer cushion to a limited area of the occupant's side while the main chamber maintains the occupant some distance from the door.

Figure 6:
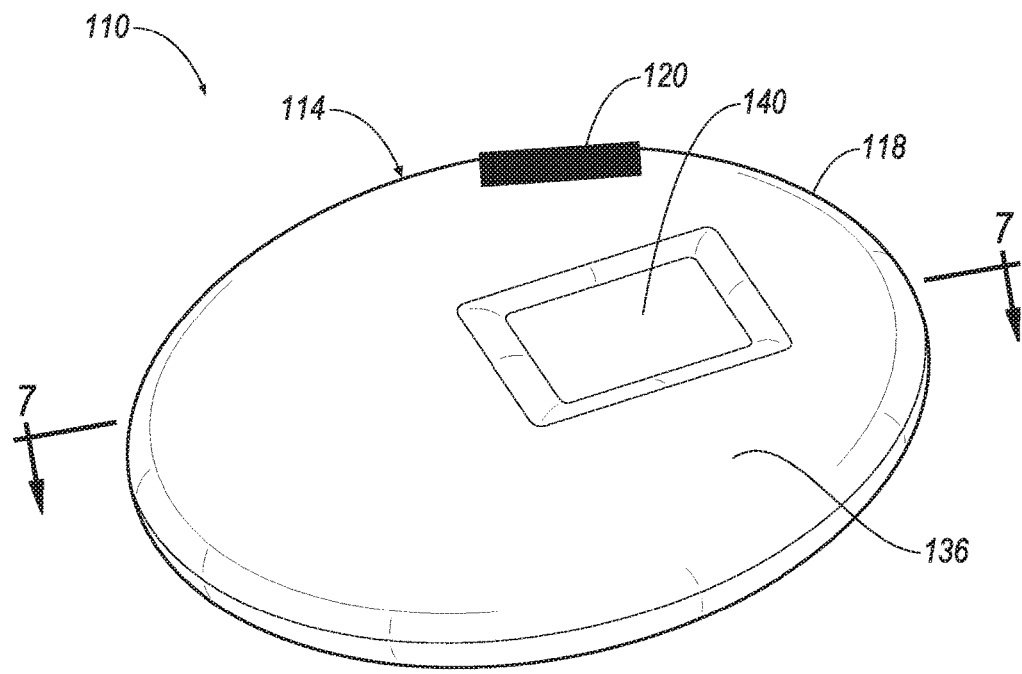
FIG. 6 is a perspective view of alternative side airbag configuration in a deployed condition.
Figure 7:
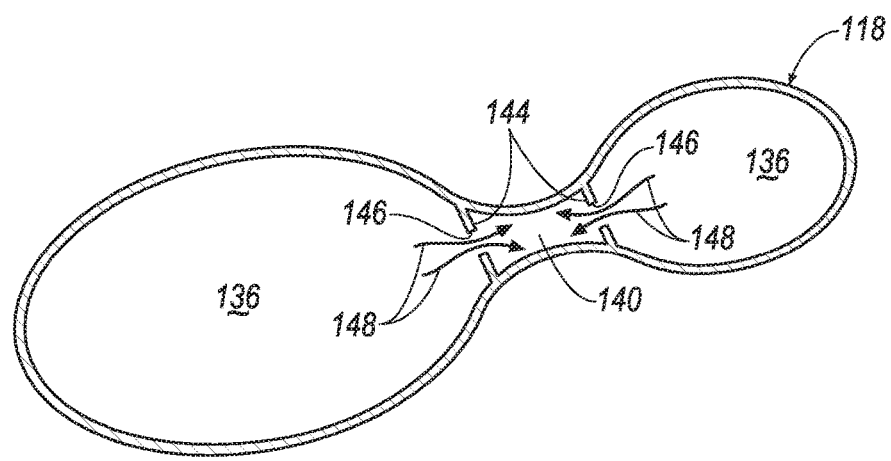
FIG. 7 is a sectional view of the airbag of FIG. 6 in the direction of arrows 7.

An alternative embodiment of an airbag 118, comprising part of an alternative airbag system 110 and an alternative airbag module 114, has a main chamber 136 and a necking chamber 140 is illustrated in an inflated condition in FIGS. 6 and 7. Airbag 118 is shown connected to an inflator 120. The airbag 118 has a wall 144 separating main chamber 136 and necking chamber 140. The wall 144 includes restrictive vents 146 restricting the flow of gasses from the main chamber 136 to necking chamber 140. FIG. 7 illustrates necking chamber 140 as being narrowest at its center. Tethers across the center connecting opposite sides of the necking chamber (not shown) may be employed to aid in achieving such a shape in the inflated condition. Alternatively, necking chamber 140 may be allowed to bulge outward at its center. Arrows 148 illustrate a gas flow path from the main chamber 136 to the necking chamber 140.

Figure 8:
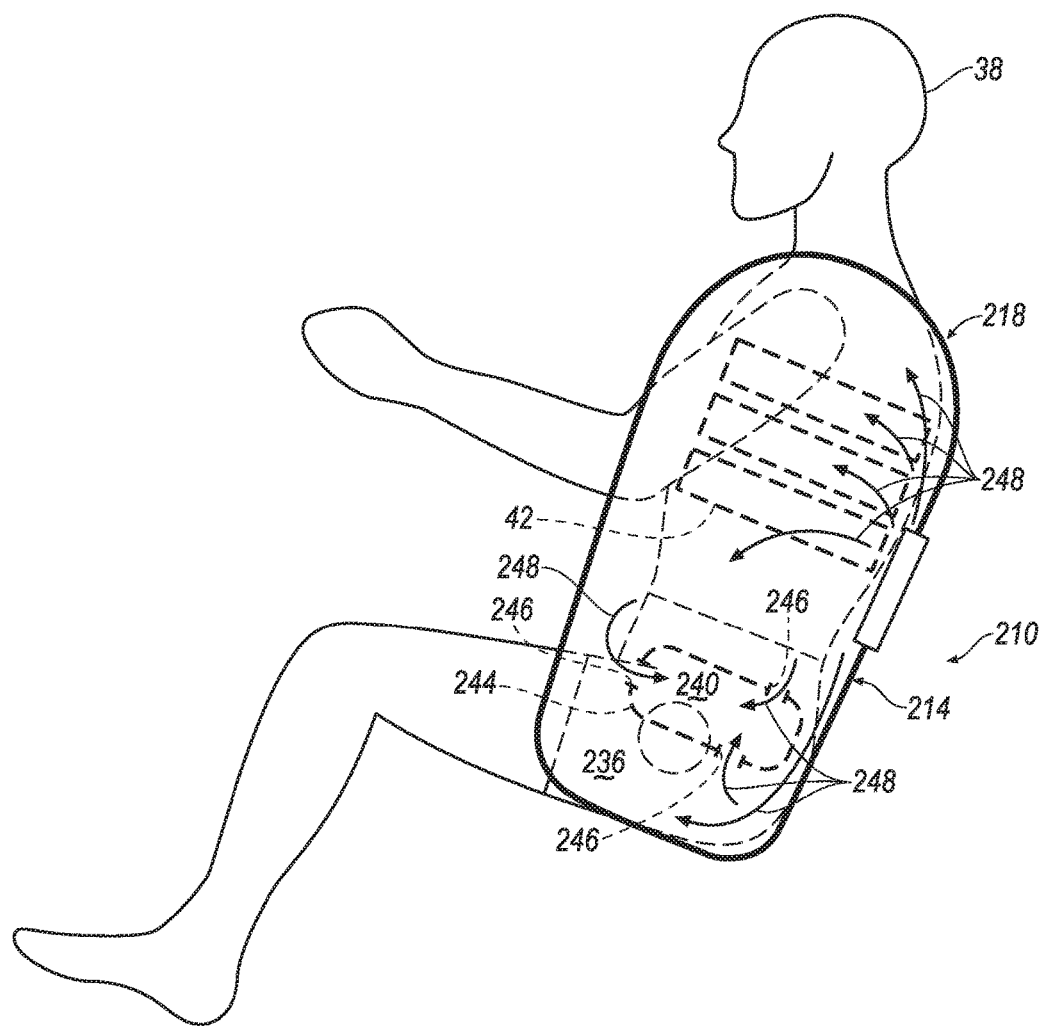
FIG. 8 is a side view of an alternative side airbag configuration in a deployed position relative to the impact dummy in the seated position.

Another alternative embodiment of an airbag 218, comprising part of an alternative airbag system 210 and an alternative airbag module 214, is illustrated in FIG. 8. The airbag 218 is much like that of airbag 18 as shown in FIGS. 3-5C, except for the location and shape of an example necking chamber 240 of the airbag 218. Necking chamber 240 is peripherally surrounded by a main chamber 236. The necking chamber 240, defined by a wall 244 with restrictive vents 246, is located to align with the pelvis area, more specifically, an iliac wing area of the dummy 38 and thus an occupant of the vehicle 12. An example area for necking chamber 240 may be 7.5-10 centimeters above the seat and 2.5-12 centimeters forward of a rear of the airbag 218. Arrows 248 illustrate a gas flow path from the main chamber 236 to the necking chamber 240.

Figure 9:
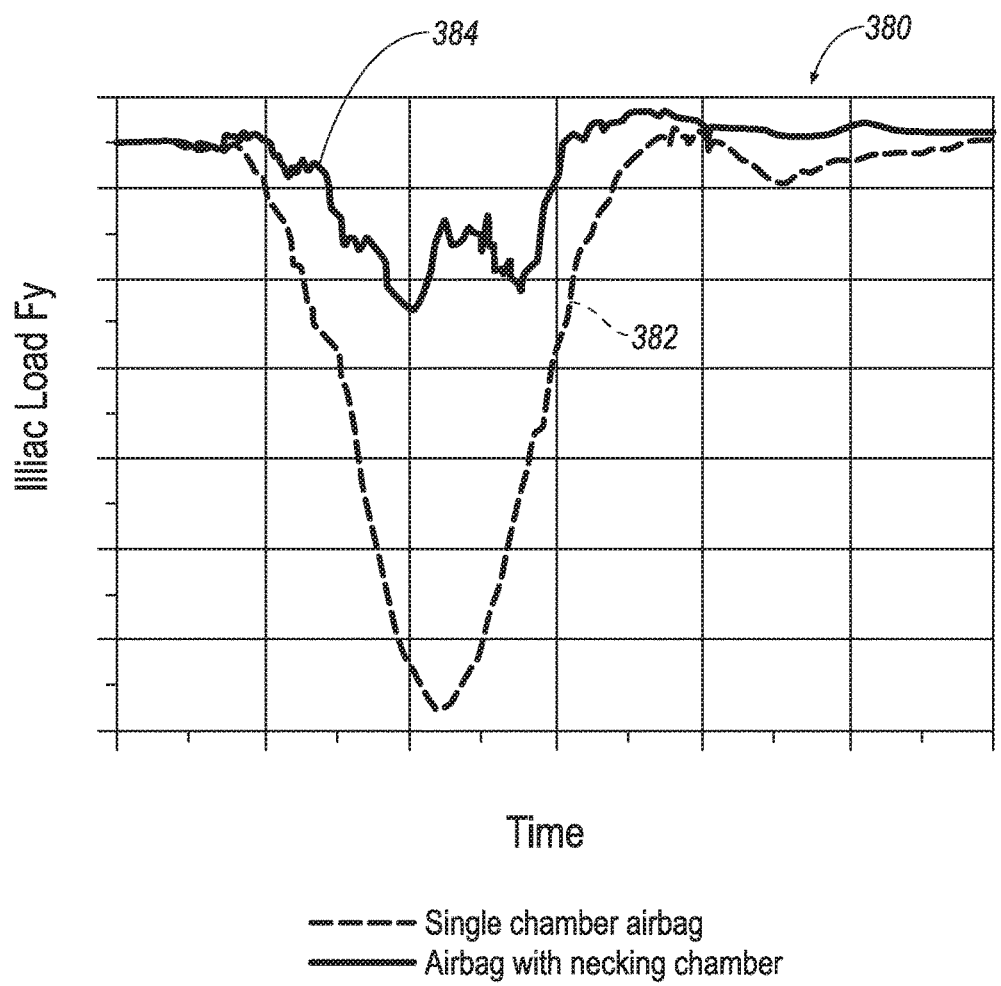
FIG. 9 is an example performance plot chart.

FIG. 9 provides an example plot 380 illustrating a potential for force reduction in the iliac wing area with the necking chamber 240 of airbag 218 overlapping the iliac wing area. A first trace 382 illustrates a force associated with an example impact in combination with a single chamber airbag, e.g., an airbag of the shape and size of airbag 218, but without the necking chamber 240. A second trace 384 illustrates a reduced force that may be sustained by the dummy in the iliac wing area when subjected to an identical impact, but with the airbag 218 including a necking chamber 240 in alignment with the iliac wing area. The illustrated force reduction is from a peak of 1.25 kN for a single chamber airbag to a peak of 0.37 kN for an airbag including a necking chamber. Such a reduction in force may be associated with a pressure in the necking chamber 240 being lower in magnitude than a pressure in the main chamber 236, and to the thickness T2 of the necking chamber 240 being less than the thickness T1 of the main chamber 236, as the airbag 218 is engaged by the dummy 38.

Although not illustrated, a side airbag may be provided with multiple necking chambers surrounded by a common main chamber to more gently cushion multiple areas of the side of an occupant.

An example airbag including a main chamber and a necking chamber has been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

The disclosure has been described in an illustrative manner, and it is to be understood that the terminology which has been used is intended to be in the nature of words of description rather than of limitation. All terms used in the claims are intended to be given their plain and ordinary meanings as understood by those skilled in the art unless an explicit indication to the contrary in made herein. Many modifications and variations of the present disclosure are possible in light of the above teachings, and the disclosure may be practiced otherwise than as specifically described.

What is claimed is:

1. A side airbag for a vehicle comprising:
   a main chamber including an opening for connecting to an inflator and including a first airbag thickness in an inflated condition;
   a necking chamber peripherally surrounded by the main chamber and connected thereto by a restrictive vent and including a second airbag thickness in the inflated condition less than the first airbag thickness and aligned with a targeted body area; and
   a wall separating the main chamber from the necking chamber and in part defining the second airbag thickness;
   wherein a plurality of restrictive vents are disposed in the wall.

2. The side airbag of claim 1, wherein the opening for connecting to the inflator is at a rear of the airbag in the inflated condition and no restrictive vent is on a rear side of the necking chamber.

3. The side airbag of claim 1, wherein the airbag in the inflated condition is sized to extend substantially from a seat bottom to a top of a seat back.

4. The side airbag of claim 1, wherein the targeted body area is one of a rear rib-cage area and a pelvic area.

5. A side airbag module for a passenger vehicle comprising:
   a housing shaped for mounting in a seat back;
   an inflator connected to the housing; and
   an airbag disposed in the housing in a deflated condition and including:
      a main chamber including an opening for receiving an inflator and including a first airbag thickness in an inflated condition,
      a necking chamber peripherally surrounded by the main chamber connected thereto by a restrictive vent and including a second airbag thickness in the inflated condition less than the first airbag thickness and aligned with a targeted body area; and
      a wall separating the main chamber from the necking chamber and in part defining the second airbag thickness;
      wherein a plurality of restrictive vents are disposed in the wall.

6. The module of claim 5, wherein the opening for connecting to the inflator is at a rear of the airbag in the inflated condition and no restrictive vent is on a rear side of the necking chamber.

7. The module of claim 5, wherein the airbag in the inflated condition is sized to extend substantially from a seat bottom to a top of a seat back.

8. The module of claim 5, wherein the targeted body area is one of a rear rib-cage area and a pelvic area.

9. A side airbag system for use in a passenger vehicle comprising:
   a seat back including a cover; and
   a side airbag module shaped for mounting in a seat back fixed to the seat back beneath the cover, the side airbag module including:
      a housing shaped for mounting in a seat back,
      an inflator connected to the housing, and
      an airbag disposed in the housing in a deflated condition and including:
         a main chamber including a part of the inflator disposed therein and including a first airbag thickness in an inflated condition, and a necking chamber peripherally surrounded by the main chamber connected thereto by a restrictive vent and including a second airbag thickness in the inflated condition less than the first airbag thickness and aligned with a targeted body area;

a wall separating the main chamber from the necking chamber and in part defining the second airbag thickness;

wherein a plurality of restrictive vents are disposed in the wall with none of the vents being in a rear portion of the wall.

10. The side airbag system of claim 9, wherein the airbag in the inflated condition is sized to extend substantially from a seat bottom to a top of a seat back.

11. The side airbag system of claim 9, wherein the targeted body area is one of a rear rib-cage area and a pelvic area.

* * * * *